United States Patent

Newman

[11] Patent Number: 5,558,375
[45] Date of Patent: Sep. 24, 1996

[54] QUICK ATTACH, REUSABLE HOSE FITTINGS

[75] Inventor: Kenneth L. Newman, Moline, Ill.

[73] Assignee: Deere & Company, Moline, Ill.

[21] Appl. No.: 500,074

[22] Filed: Jul. 10, 1995

[51] Int. Cl.$^6$ .................................................. F16L 55/00
[52] U.S. Cl. .......................... 285/23; 285/177; 285/249; 285/351
[58] Field of Search ............................ 285/23, 249, 255, 285/382–7, 177, 351

[56] References Cited

U.S. PATENT DOCUMENTS

| | | |
|---|---|---|
| 1,175,532 | 3/1916 | Lambkin .................................. 285/249 |
| 2,449,916 | 9/1948 | Tandet . |
| 2,541,200 | 2/1951 | Brubaker . |
| 2,552,077 | 5/1951 | Williams et al. ......................... 285/249 |
| 3,348,863 | 10/1967 | Rinker .................................. 285/255 X |
| 3,679,239 | 7/1972 | Schmitt ............................... 285/249 X |
| 4,032,177 | 6/1977 | Anderson ............................. 285/249 X |
| 4,220,359 | 9/1980 | Evenson et al. ....................... 285/249 |

Primary Examiner—Dave W. Arola

[57] ABSTRACT

A reusable hose fitting, which may be assembled using simple hand tools, includes a fitting body having an exteriorly threaded section on which is received a threaded bore of a compression nut. The fitting body includes a nipple having a diameter somewhat less than the threaded section and joined thereto by an annular locating surface. A compressible sleeve is located within the compression nut and has a pair of axially spaced, frusto-conical exterior surfaces which cooperate with complementary interior surfaces of the compression nut to exert a pair of axially spaced zones of pressure to clamp a hose, that has its end positioned against the locating surface of the fitting body, against the nipple. Cooperating surfaces of the compression nut and compressible sleeve prevent the latter from being accidentally dislodged from the compression nut once inserted past the threaded bore of the nut. A pair of o-rings having different outside diameters are provided in axially spaced grooves in the nipple so that effective sealing may be accomplished with hoses having slightly different inside diameters.

7 Claims, 1 Drawing Sheet

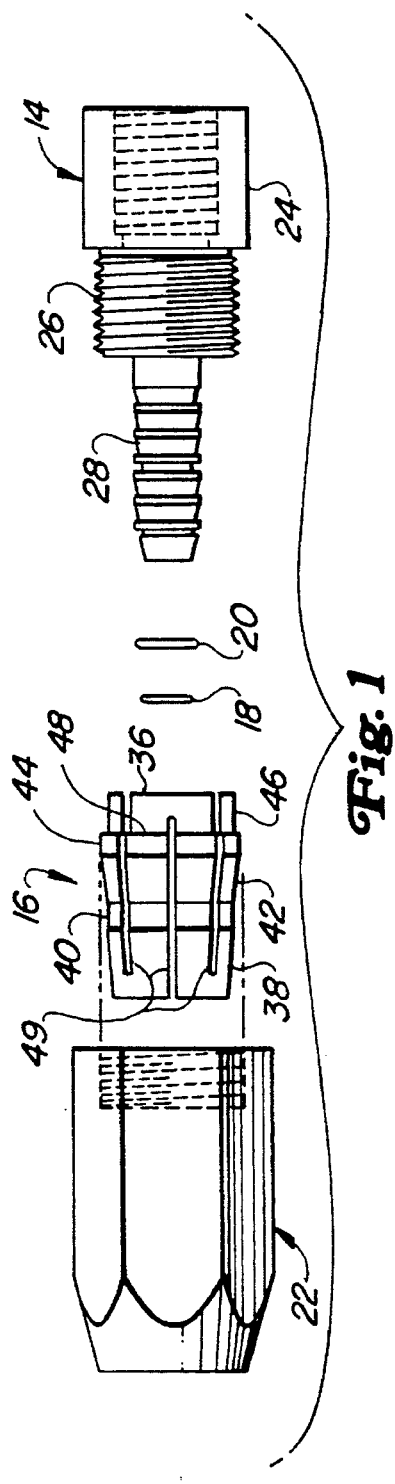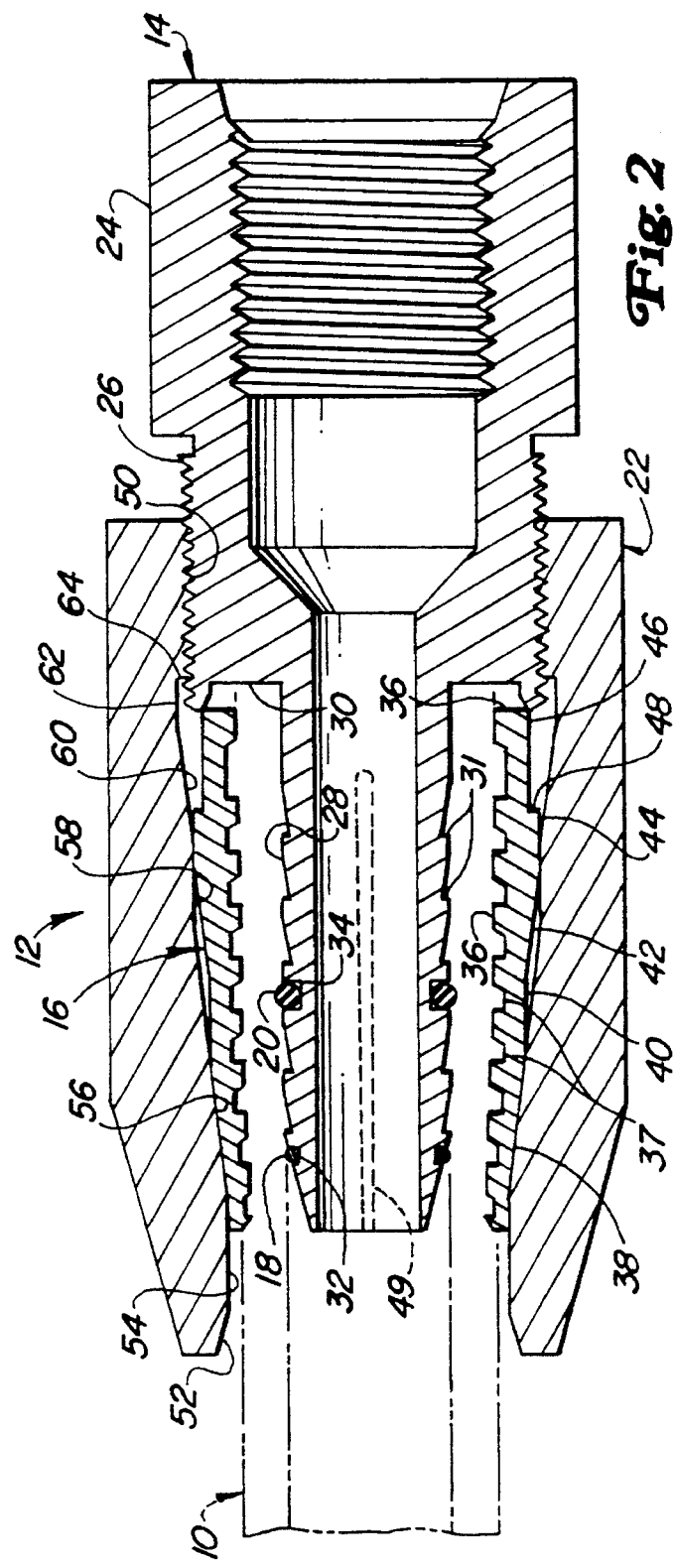

QUICK ATTACH, REUSABLE HOSE FITTINGS

BACKGROUND OF THE INVENTION

The present invention relates to hose fittings and more specifically relates to reusable hose fittings of a type which may be attached by using simple hand tools.

Known are hose fittings of a type including a fitting body, a compression sleeve and a compression nut assembled such that tapered surfaces of the sleeve and nut act to clamp the hose onto a nipple of the fitting body as the compression nut is tightened onto a threaded portion of the body. U.S. Pat. No. 2,449,916 issued to Tandet on 21 Sep. 1948 and U.S. Pat. No. 2,541,200 issued to Brubaker on 13 Feb. 1951 disclose examples of this type of fitting.

A problem with these prior art fittings is that they are not designed for carrying high pressures and thus are not usable with modern agricultural or industrial tractor hydraulic systems which sometimes require fluid pressure in the neighborhood of 5000 psi.

SUMMARY OF THE INVENTION

According to the present invention, there is provided a fitting of the above-noted type which has an improved fluid pressure capacity.

An object of the invention is to provide a fitting of the type including a fitting body having a nipple projecting from a threaded side of the body, a compression sleeve and a compression nut, wherein the compression sleeve has a pair of axially spaced contact zones which cooperate with a pair of axially spaced contact zones of said compression nut to spread the clamping force equally along a hose extending through said compression sleeve and being received on said nipple.

Another object of the invention is to provide a fitting as set forth in the immediately preceding object wherein a pair of o-rings are respectively received in a pair of annular grooves provided at axially spaced locations in the fitting body nipple.

Yet another object of the invention is to provide a fitting as set forth above wherein the compression sleeve and compression nut are provided with cooperating surfaces for retaining the compression sleeve within the nut while inserting a hose into the sleeve.

BRIEF DESCRIPTION OF THE DRAWINGS

FIG. 1 is an exploded view showing the fitting components clampable onto a hose end.

FIG. 2 is a vertical longitudinal sectional view showing the fitting components assembled onto a hose, which is shown in phantom.

DESCRIPTION OF THE PREFERRED EMBODIMENT

Referring now to the drawings, there is shown a flexible hose 10 (FIG. 2) having a fitting assembly 12, constructed in accordance with the present invention, secured to one of its ends. The hose 10 may be constructed of rubber or a thermoplastic material.

The assembly 12 comprises a fitting body 14, a compression sleeve or collet 16, a pair of o-rings 18 and 20 and a compression nut 22.

As can best be seen in FIG. 2, the fitting body 14 is tubular so as to provide a fluid passage along its central longitudinal axis. Viewed in the position shown, the fitting body 14 includes a right end section defining a wrench-engagable nut 24 having a threaded interior, an exteriorly threaded intermediate section 26 and a left end section defining a stem or nipple 28 stepped down in diameter from the intermediate section 26 such that an annular stop surface 30 is defined at a left end of the intermediate section 26. As is common in the art, the stem 28 has a plurality of conical flutes or barbs 31 formed along its length for resisting removal of the hose 10 once the latter has been forced onto the stem. In addition the stem 28 has first and second o-ring grooves 32 and 34 spaced axially from each other along the length of the stem for receiving the o-ring seals 18 and 20, respectively.

The sleeve or collet 16 may be made from plastic or metal material and has a length commensurate with that of the stem or nipple 28 of the fitting body 14. As viewed in the drawings, the inside and outside diameters of the sleeve 16 increase from left to right. Specifically, the inside diameter increases gradually from left to right so as to define a uniformly tapered interior wall 36 which is provided with annular grooves 37 so that the wall grips onto the exterior of the hose 10 when the fitting assembly 12 is secured on the hose end, as shown in FIG. 2. Preceding from left to right, the exterior surface of the sleeve or collet 16 is defined by a first frusto-conical section 38, a first cylindrical section 40, a second frusto-conical section 42 and second and third cylindrical sections 44 and 46, respectively. The frusto-conical sections 38 and 42 each increase in diameter from left to right and provide axially spaced clamping surfaces, as is explained more fully below. The third cylindrical section 46 is smaller in diameter than the second cylindrical section 40 and is joined to the latter by a rightwardly facing shoulder or surface 48 having a purpose explained below. A plurality of slots 49, alternately extending longitudinally from the left and right ends of the sleeve 16 are provided to enhance its flexibility so that it may be compressed or deformed against the hose 10 without pinching the hose.

The right end of the interior of the compression nut 22 includes a threaded bore 50 sized for being screwed onto the exteriorly threaded section 26 of the fitting body 14, as shown in FIG. 2. Preceding from left to right in FIG. 2, it can be seen that the interior surface of the compression nut 22 includes a short leftwardly flared entry or guide section 52 joined to a first cylindrical section 54 having a diameter approximately equal to the small end of the first frusto-conical section 38 of the sleeve 16. Following the cylindrical section 54 is a first frusto-conical section 56 having a taper complementary to, but being longer than, the first frusto-conical section 38 of the sleeve 16. A second cylindrical section 58 is located between and is joined to the first frusto-conical section 56 and a second frusto-conical section 60, the latter being tapered complementary to the second frusto-conical surface 42 of the sleeve 16 and joined to a third cylindrical section 62 terminating rightwardly at a leftward facing, annular locating or retaining surface 64 having an outer diameter which is slightly greater than the nominal diameter of the threaded bore 50.

The procedure for securing the fitting assembly 12 to an end of the hose 10 will now be briefly described. The sleeve or collet 16 is first inserted through the threaded bore 50 of the compression nut 22. Because the second cylindrical section 44 of the collet 16 has a diameter which is greater than the diameter of the threaded bore 50, the collet will deflect inwardly as it moves through the bore 50. Once free of the bore, the collet 16 will, expand to its undeflected state.

The shoulder 48 of the collet 16 will then be disposed in confronting relationship to the retaining surface 64, whereby the collet 16 is prevented from being dislodged from the compression nut 22 by way of the bore 50.

The compression nut 22 will then be screwed a short distance onto the fitting body 14. Next, the hose 10 will be pushed onto the nipple 28 and into the collet 16. Initial movement of the hose 10 will seat the surface 48 of collet 16 against the retaining surface 64. The collet 16 is then located in larger diameter sections of the compression nut 12 which will permit free expansion of the collet as the hose 10 is inserted further thereinto. The hose 10 is in place once it bottoms out against the annular stop surface 30 of the fitting body 14. Once the hose 10 and collet 16 are in place, the compression nut 22 is tightened onto the threaded end 26 of the fitting body 14 with the use of appropriate hand tools. As the compression nut 22 is tightened, it advances axially rightwardly relative to the collet 16, as viewed in FIG. 2. This relative axial movement will cause the frusto-conical surfaces 56 and 60 of the nut 22 to respectively press against the frusto-conical surfaces 38 and 42 of the collet 16 to effect two distinct axially spaced zones of compression to increasingly deflect the collet inwardly so as to effect an increasing force clamping the hose 10 between the nipple 28 and interior of the collet 16. It is here noted that the inside diameter of the hose will now be engaged with the o-rings 34 and 32 with the different sizes of the o-rings ensuring a good seal for hose is having slightly different inside diameters.

As the compression nut 22 is tightened to the point that the threaded section 26 of the fitting body 14 extends beyond the threaded bore 50 of the compression nut 12, the frusto-conical surface 60 of the compression nut 22 will be moved from engagement with the frusto-conical surface 42 of the collet 16, with the compression nut cylindrical surface 58 then moving into engagement with the cylindrical surface 44 of the collet 16, while the relatively long frusto-conical surface 56 of the compression nut remains in contact with the collet frusto-conical surface 38 throughout the tightening of the compression nut 22 onto the fitting body 14. The fitting 12 is then completely installed onto the end of the hose 10 with the relative positions of the elements of the fitting being as shown in FIG. 2.

It will be appreciated that, since no crimping is required to apply the fitting 12 to the hose 10, the fitting is reusable, with disassembly from the hose being accomplished by first removing the compression nut 22, then removing the collet 16, and finally removing the hose 10. However, it may be necessary to replace the collet 16 before the next installation of the fitting.

I claim:

1. In a hose fitting including a fitting body, a compressible collet and a compression nut, with said fitting body having an exteriorly threaded section to which is joined a nipple having an outside diameter somewhat less than a diameter of said threaded section so as to define an annular stop surface facing axially in a first direction, with said compression nut being disposed in concentric relationship to said nipple and having a threaded bore at one end screwed onto said threaded section of said fitting body and with said collet being received within said compression nut and having a frusto-conical exterior surface section located for cooperating with a frusto-conical interior surface section of said compression nut to effect a first force in a first zone for deflecting the collet inwardly as the compression nut moves axially in a second direction relative to said collet when being screwed onto said threaded section, the improvement comprising: said collet having a second frusto-conical exterior surface section spaced axially from said first-named frusto-conical exterior surface; section and said compression nut having a second frusto-conical interior surface section spaced axially from said first-named frusto-conical exterior surface section, with said second exterior and interior frusto-conical surface sections being disposed for cooperating with each other to effect a second force in a second zone for deflecting the collet inwardly as the compression nut moves axially in said second direction relative to said collet; and said collet having an annular surface joined to said second frusto-conical surface and facing axially in said second direction; and said compression nut including an annular retaining surface located radially outwardly of said threaded bore and disposed in confronting relationship to said shoulder, whereby said collet may be preassembled by inserting it through said threaded bore of said compression nut while the collet is in an inwardly compressed state, the collet then returning to its uncompressed state where the annular shoulder thereof confronts the retaining surface of said compression nut and thus is prevented from being dislodged from the interior of said compression nut.

2. The hose fitting defined in claim 1 wherein the first-named and second frusto-conical exterior surface sections of said collet are joined by a first cylindrical exterior surface section; and wherein the first-named and second frusto-conical interior surface sections of said compression nut are joined by a first cylindrical interior surface section.

3. The hose fitting defined in claim 2 wherein an inside end of said threaded bore of said compression nut is surrounded by said annular retaining surface; and said compression nut including a second cylindrical surface section joining said second frusto-conical interior surface section with said retaining surface.

4. The hose fitting defined in claim 3 wherein said collet includes a second cylindrical exterior surface section extending between said second frusto-conical exterior surface section and said annular surface.

5. The hose fitting defined in claim 1 wherein said nipple of said fitting body is provided with first and second axially spaced, annular o-ring grooves; and first and second o-rings being placed in said first and second o-ring grooves.

6. The hose fitting defined in claim 5 wherein one of said o-rings has an outside diameter which is different than the outside diameter of the other of said o-rings, whereby the o-rings are adapted for effecting sealing against hoses having different interior diameters.

7. In a hose fitting including a fitting body having an exteriorly threaded section joined by an axially facing locating surface to a barbed nipple adapted for being inserted into a hose to an extent where an end of said hose abuts said locating surface, a compressible sleeve adapted for being disposed on said hose in coaxial, coextensive relationship to said nipple, and a compression nut having a threaded bore at one end adapted for being screwed upon said threaded section of said fitting body; the improvement comprising: said compression nut having an annular retaining surface disposed about an inner end of said threaded bore; and said compressible sleeve having an annular shoulder having a diameter larger than a diameter of said threaded bore and being disposed for confronting said retaining surface once the compressible sleeve has been installed within said compression nut by being forced through said threaded bore, whereby said compressible sleeve will remain in place in said compression nut as said hose is forced over said nipple, into said compressible sleeve and against said locating surface.

* * * * *